United States Patent [19]

Kiuchi et al.

[11] Patent Number: 4,992,821

[45] Date of Patent: Feb. 12, 1991

[54] CAMERA

[75] Inventors: Masayoshi Kiuchi; Ichiro Ohnuki, both of Kanagawa; Tsunemasa Ohara; Tetsuya Nishio, both of Tokyo, all of Japan

[73] Assignee: Canon Kabushiki Kaisha, Tokyo, Japan

[21] Appl. No.: 390,523

[22] Filed: Aug. 7, 1989

[30] Foreign Application Priority Data

Aug. 16, 1988 [JP] Japan ................................ 63-203577
Aug. 16, 1988 [JP] Japan ................................ 63-203578

[51] Int. Cl.$^5$ ............................................... G03B 7/26
[52] U.S. Cl. ................................ 354/484; 354/173.1; 354/468
[58] Field of Search ............ 354/412, 468, 484, 173.1, 354/173.11

[56] References Cited

U.S. PATENT DOCUMENTS

| | | | |
|---|---|---|---|
| 4,429,975 | 2/1984 | Shiozawa et al. | 354/484 |
| 4,579,435 | 4/1986 | Haraguchi | 354/173.1 |
| 4,673,272 | 6/1987 | Suzuki et al. | 354/173.11 |
| 4,697,899 | 10/1987 | Kawamura et al. | 354/173.11 |
| 4,782,355 | 11/1988 | Sakai et al. | 354/484 |
| 4,816,851 | 3/1989 | Fukahori et al. | 354/173.1 |
| 4,887,118 | 12/1989 | Gaewsky | 354/484 |

*Primary Examiner*—Russell E. Adams
*Attorney, Agent, or Firm*—Fitzpatrick, Cella, Harper & Scinto

[57] ABSTRACT

A camera includes a film feeding mechanism for feeding a film to take an exposure on a next frame, a charging mechanism, a focusing mechanism, a first actuator serving as a drive source for driving the film feeding mechanism, a second actuator serving as a drive source for driving the charging mechanism, a third actuator serving as a drive source for driving the focusing mechanism, a voltage detecting circuit for detecting a voltage of a power source, and a control circuit for controlling the first, second and third actuators, the control circuit permitting, when the voltage of the power source detected by the voltage detecting circuit has a value not less than a predetermined value, the third actuator to operate when the first actuator is in process of operating, and the control circuit prohibiting, when the voltage of the power source detected by the voltage detecting circuit has a value less than the predetermined value, the third actuator from operating when the first actuator and the second actuator are in process of operating.

9 Claims, 2 Drawing Sheets

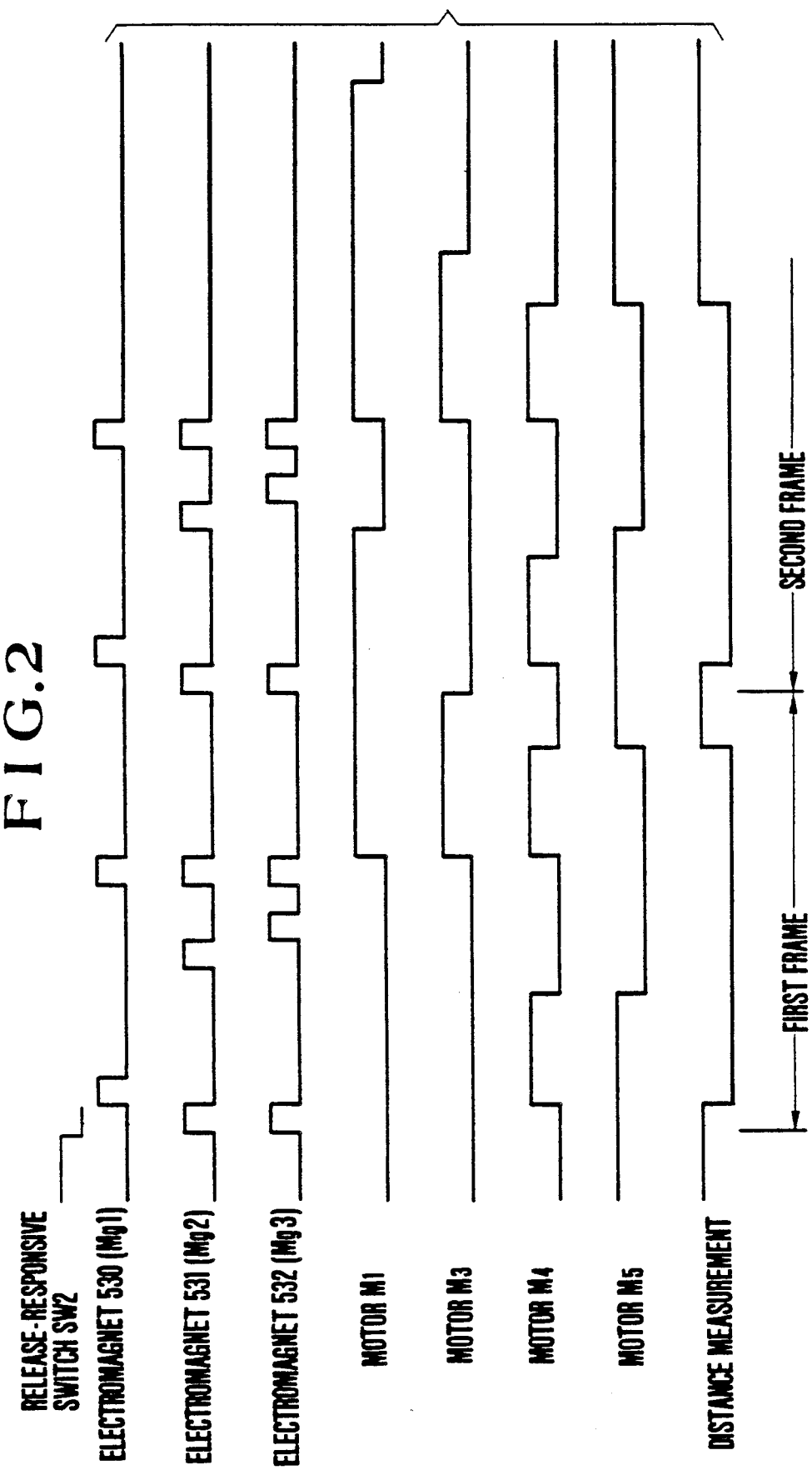

CAMERA

BACKGROUND OF THE INVENTION

1. Field of the Invention

This invention relates to a camera of the kind incorporating a motor therein.

2. Description of the Related Art

Many of the cameras manufactured these days are arranged to automatically perform various operations such as film winding and rewinding, focusing, aperture operating and shutter charging actions with a motor power. The cameras of this kind are disclosed, for example, in U.S. Pats. No. 4,579,435, No. 4,673,272, No. 4,697,899, No. 4,816,851, etc.. In the case of the conventional manual operating type camera, these operations are serially and not simultaneously performed. Whereas, the latest motor-incorporating type cameras are arranged to permit high-speed photographing and quick preparatory actions by simultaneously performing at least two of the above-stated different actions, as disclosed in U.S. Pat. No. 4,659,201, etc.. Some of the latest cameras is provided with different motors specially for different operations respectively, as disclosed in U.S. Pat. No. 4,616,913, for carrying out the above-stated various actions at a high speed. The camera of that kind permits continuous photographing at such a high speed that has been hardly possible with the conventional camera.

The camera of the kind having at least two motors for automatic execution of film winding, film rewinding, focusing, aperture operating and shutter charging actions, etc. is capable of quickly carrying out photographing preparations and photographing. However, the camera necessitates the minimum operative voltage of a battery to be set at a high value, because several currents must be simultaneously allowed to flow to a plurality of motors. The battery, therefore, must be replaced when it still has an output voltage at a level high enough for a power supply to a single motor. This necessitates premature battery replacement and is, therefore, disadvantageous in terms of economy.

Many electronic circuits are included in the latest cameras and also in the camera accessories of varied kinds in many cases. A camera system having the electronic circuits mounted on both the camera and the accessory thereof is required to have not only perfect mechanical coupling but also perfect electrical connection between the camera and the accessory when the camera is used with the accessory mounted thereon.

The mechanical coupling of the camera with the accessory may be simply detected by the known detecting method of using a limit switch or the like which has been used for the conventional camera. However, the detecting method of using a limit switch or the like has been disadvantageous as the limit switch not only tends to malfunction but requires a space for setting it in addition to a space for electric circuit connection terminals. Besides, the conventional arrangement for detecting the mounted or coupled state by means of a limit switch is used for detecting the electrical connection of the accessory to the camera. It has been provided merely for electrical detection of a mechanical mounted state and not for detecting an electrically connected state. Further, since the electronic circuit is incapable of detecting the kind of the accessory mounted on the camera, another problem with the conventional arrangement is that the electronic circuit cannot be automatically set in accordance with the kind of the accessory.

SUMMARY OF THE INVENTION

It is one aspect of this invention to provide a camera which is capable of using a battery up to the serviceable limit thereof by allowing a maximum of two different actions to be performed in parallel when the battery voltage is at a low level and by allowing three different actions to be simultaneously performed when the battery voltage is still at a high level.

It is another aspect of the invention to provide a camera which is capable of electrically detecting and confirming an electrically connected state between the camera and an accessory which incorporates therein an electronic circuit or a battery when the latter is mounted on the former and is arranged to obviate the necessity of using a limit switch or the like for detection.

BRIEF DESCRIPTION OF THE DRAWINGS

FIGS. 1 and 2 show, by way of example, sequences in which various actuators included in a camera arranged according to this invention are energized. FIGS. 3(a) and 3(b) show in outline the arrangement of the camera which is arranged as an embodiment of the invention and that of an accessory of the camera. FIGS. 4, 4(a) and 4(b) show the electrical arrangement of the camera shown in FIGS. 3(a) and 3(b). FIGS. 5 to 13 are flow charts showing programs to be executed by the same camera.

DETAILED DESCRIPTION OF THE PREFERRED EMBODIMENT

Figure 1:
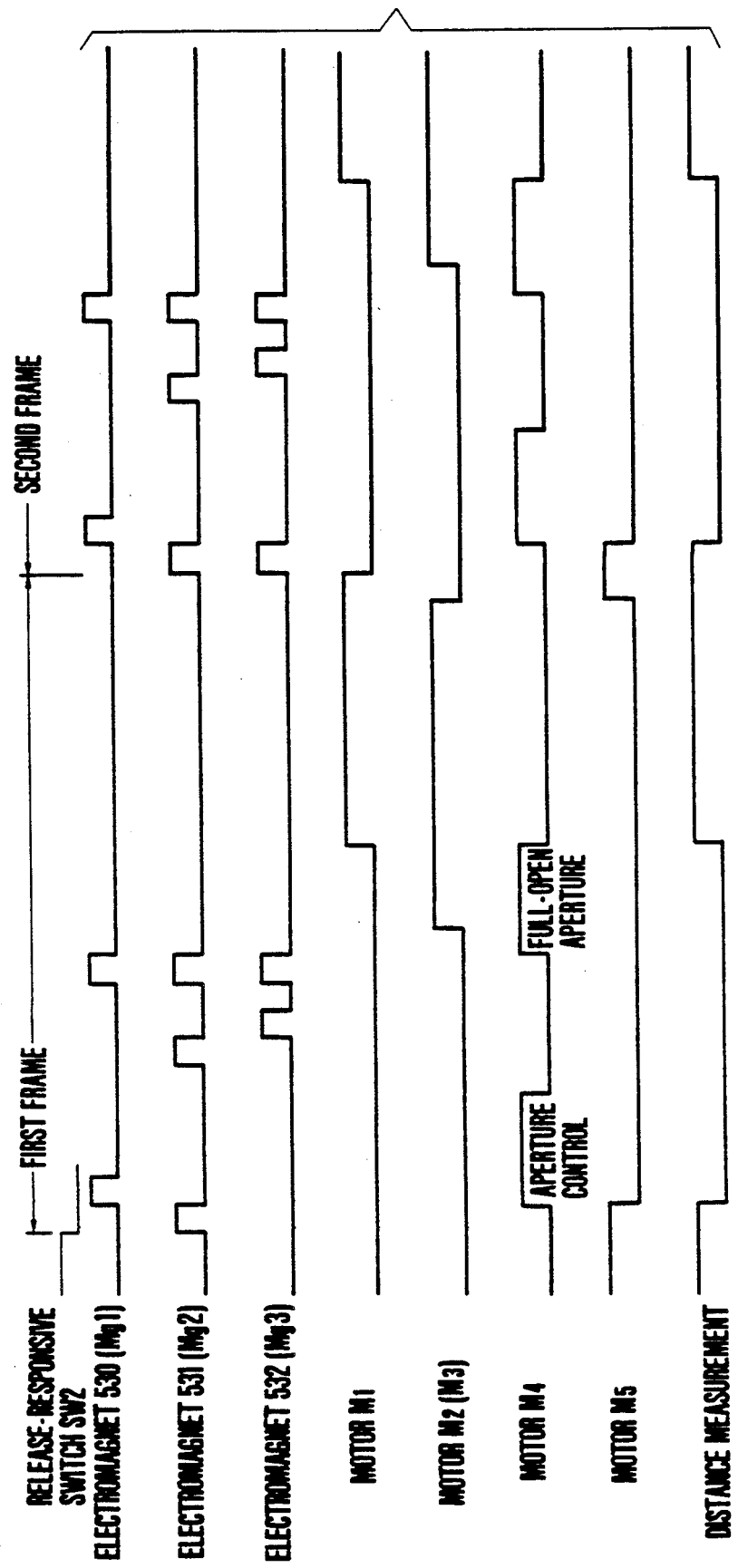

A camera which is arranged as an embodiment of this invention controls the operating sequence of various actuators in such a way as to allow shutter charging, film winding, focusing and diaphragm driving actions, etc. to be simultaneously performed when the voltage of a battery is above a given level and to inhibit three or more of the above-stated actions from being simultaneously performed when the battery voltage is below the given level. Further, in the event that battery voltage is below the given level, the operating sequence of the embodiment is such that the film winding action is allowed to begin following completion of the diaphragm driving action after the shutter charging and diaphragm driving actions are simultaneously allowed to begin.

In this embodiment, means for detecting an input voltage level is included either in an electronic circuit disposed within the camera or in an electronic circuit disposed within an accessory of the camera. The embodiment is further provided with input voltage limiting means for limiting the input voltage of the input voltage level detecting means to a voltage level lower than the bias voltage of the electronic circuit. Then, an accessory mounting detector is formed by arranging a pair of connection terminals relative to this input voltage limiting means on both the camera and the accessory. More specifically, the accessory mounting detector of this embodiment includes input voltage level detecting means which is composed of an electronic circuit disposed either within the camera or within the accessory; connection terminals which are connected to the input voltage level detecting means of the electronic circuit and formed on the surface of the camera or that of the accessory; and input voltage limiting means which limits a voltage supplied via the connection terminal to the input voltage level detecting means to a level lower than the bias voltage of the electronic circuit when the accessory is mounted on the camera.

Therefore, either an electronic circuit connecting terminal connected to the electronic circuit disposed within the camera or to the electronic circuit disposed within the accessory or a power circuit connecting terminal can be used as a part of the accessory mounting detector without requiring use of to a limit switch or the like. Therefore, no space is necessary for the limit switch. Further, this arrangement reduces the possibility of faulty operations and enables this embodiment to electrically detect the electrical connection of the camera to the accessory.

The details of this embodiment are as described below with reference to the accompanying drawings. In the case of the embodiment described below, the invention is applied to an single-lens reflex camera which includes two motors and a first battery therein and is illustrated in combination with a motor drive device which includes therein one motor and a second battery.

FIGS. 3(a) shows in outline the structural arrangement of the motor-incorporating type camera B of this embodiment. FIG. 3(b) shows in outline the arrangement of the motor drive device MD which is arranged to be used as an accessory of the invented camera.

Referring to FIGS. 3(a) and 3(b), these illustrations include the first battery V1 disposed within the camera B; a first motor M1 which is arranged to drive a film winding transmission mechanism K1 disposed within the camera B; and a second motor M2 which is arranged to drive a film rewinding transmission mechanism R and a shutter charging transmission mechanism C. A power transmission mechanism K2 includes a switching mechanism which switches one power transmission route over to another in such a way as to transmit the power generated by the motor M2 to the film rewinding transmission mechanism R and also to the shutter charging transmission mechanism C when the motor drive device MD is not mounted on the camera B and to transmit it only to the film rewinding transmission mechanism R when the motor drive device MD is mounted on the camera B. A coupler D1 is arranged to couple the power transmission mechanism of the motor drive device MD with that of the camera B when the motor drive device MD is mounted on the camera. An electrical connection terminal El is arranged to be connected to the electrical connection terminal disposed on the side of the motor drive device MD.

Meanwhile, the motor drive device MD includes the above-stated second battery V2; a third motor M3; a power transmission mechanism K3 which is connected to the motor M3; a coupler D2 which is connected to the power transmission mechanism K3 and is arranged to be coupled with the above-stated coupler D1; an electrical connection terminal E2 which is arranged to be connected to the electrical connection terminal E1 of the camera B; an electronic circuit F including a motor control circuit which is arranged to control the motor M3 and an information exchange circuit which is arranged to exchange signals with an electronic circuit disposed inside the camera B; and a mounting screw L which is to be screwed into a screw hole provided in the bottom side of the camera B.

FIG. 4 includes FIGS. 4(a) and 4(b) which are a circuit diagrams showing the electrical arrangement of the essential parts of the camera B and the motor drive device MD.

The actuator control means mentioned in the foregoing consists of a microcomputer which is disposed within the camera body, an electronic circuit which is disposed within a lens barrel and an electronic circuit which is disposed within the motor drive device.

Referring to FIGS. 4, 4(a) and 4(b), the camera body 500 excluding the lens barrel part is encompassed with a two-dot chain line. An interchangeable lens 600 which is mounted on the body of the camera 500 is encompassed with a one-dot chain line. The motor drive device is denoted by a reference numeral 700 and is encompassed also with a one-dot chain line. The motor drive device 700 is arranged to be mountable on the camera 500. A grip 590 is detachably attached to one side of the camera 500. Connection terminals VBAT1, GND, etc. are formed on the mounting faces of the grip 590 and the camera 500.

The grip mounting face of the camera 500 is arranged to be usable also for mounting the motor drive device 700 (or MD) by removing the grip 590 from the camera 500. The connection terminals VBAT1, GND, etc. formed on the mounting face of the camera 500 is arranged to be usable in common for both the grip 590 and the motor drive device 700.

A lithium battery V1 of six V is disposed within the grip 590. The battery V1 is arranged to serve as a power source for a constant voltage device and motors disposed within the camera 500 and also for motors disposed within the lens 600 as will be described later.

The camera 500 contains the following elements: a DC-DC converter 510 which serves as a constant voltage source for electronic circuits of varied kinds; a microcomputer (hereinafter referred to as CPU1) which controls various sequential operations of the camera and the accessory; an oscillation circuit 516 which is arranged to supply a driving clock signal to the CPU1; a rest circuit 515 which is arranged to supply a reset signal to the CPU1; a light measuring circuit 512 which is connected to a port P1 of the CPU1 via a bus line BUS1; a distance measuring circuit 513 which is connected to a port P2 via a bus line BUS2; a display circuit 514 connected to a port P3 of the CPU1 via a bus line BUS3; a film winding motor M1; a film rewinding and shutter charging motor M2; a driving circuit 519 for the motor M1; a driving circuit 520 for the motor M2; a control circuit CPU3 formed by a microcomputer (hereinafter referred to as CPU3) which is connected to a port P5 of the CPU1 via a bus line BUS5 and is arranged to control the motor driving circuits 519 and 520; an electromagnetic switch RLY1 which is connected to a port P60 of the CPU1 and is arranged to be operated by the CPU1 when the lens 600 is mounted or when the film is rewound; a reset circuit 517 which is arranged to give a reset signal to the CPU3; an electromagnet 530 which is arranged to release a shutter mechanism from a first clamped state in response to a shutter release operation; an electromagnet 531 which is arranged to unlock the leading curtain of the shutter; and another electromagnet 532 which is arranged to unlock the trailing curtain of the shutter. To the input ports P70 to P76 of the CPU1 are connected a switch SW1 which is arranged to act in response to the start of light and distance measuring actions; a switch SW2 which is arranged to turn on in response to the start of a shutter release action; a switch SWR which is arranged to act in response to the start of film rewinding action; a switch SWB which is arranged to detect mounting of the grip 590 or the motor drive device 700; a switch SWMD which is arranged to turn off in response to the ascent of a mirror (not shown) and to turn on in response to the descent of the mirror; a switch SWCN1 which turns off upon completion of the travel of the leading shutter curtain and to turn on upon completion of a charging action on a leading curtain moving mechanism; and a switch SWCN2 which is arranged to turn off upon completion of the travel of the tailing shutter curtain and to turn on upon completion of a charging action performed on a trailing curtain moving mechanism.

A port P80 of the CPU1 is provided for detecting the terminal voltages of the battery V1 inside the grip 590 and the battery V2 inside the motor drive device 700 and is connected to a connection terminal MD1 disposed on the outside of the camera and a connection terminal MD1 disposed on an external surface of the motor drive device.

The input ports PB0 to PB4 of the CPU3 which are provided for controlling the motors M1 and M2 are connected to switches S1 to S3 which are provided for detection of information on the travel of the film and also to switches CHG1 and CHG2 which are provided for detection of the operating state of the shutter charging transmission mechanism, etc.. Further, two ports PA4 and PA5 of the CPU3 are arranged to be connected to a motor driving circuit 702 which is disposed within the motor drive device MD. When the motor drive device MD is mounted, the CPU3 controls the motor M3 which is disposed within the motor drive device MD.

In FIG. 4 (b), reference symbols M1F, M1R, M2F, M2R, M3F and M3R shown at the port PA0 to PA5 of the CPU3 respectively denote signals for forward motor rotation (F) and reverse motor rotation (R).

The barrel of lens 600 which is removably mounted on the camera 500 contains various circuit elements. They are arranged as follows: A microcomputer CPU2 (hereinafter referred to as CPU2) controls all the electrical actions to be performed within the barrel of lens 600. A reset circuit 602 is arranged to supply a reset signal to the CPU2. A motor driving circuit 603 is arranged to control a motor M4 (for automatic focusing) under the control of the CPU2. Another motor driving circuit 604 is arranged to control a motor M5 (for diaphragm driving) under the control of the CPU2. The CPU2 is connected to the port P4 of the CPU1 which is disposed within the body of the camera body 500. The CPU2 and the reset circuit 602 receive a power supply from the DC-DC converter 510 disposed within the camera body via a connection terminal disposed near to a lens mounting face. Meanwhile, the motor driving circuits 603 and 604 are arranged to receive a power supply via a connection terminal and an electromagnet RLY1 from the battery V1 of the camera B.

The motor drive device 700 contains the following circuit elements: the above-stated battery V2 which is a 12 V battery (consisting of eight AA-size batteries in the case of this embodiment); the above-stated motor M3; a motor driving circuit 702 which is arranged to drive the motor M3 and to be controlled by the CPU2 disposed within the lens barrel; a DC-DC converter 701 which is arranged to be controlled by the CPU1 disposed within the camera body and to produce a constant voltage of 6 V; an electromagnetic switch RLY2 which is also controlled by a signal from the CPU1 and is arranged to supply a voltage of 6 V or a voltage of 12 V to a terminal VM1; and a switch 704 which is arranged to turn on when the motor drive device MD is mounted on the camera body.

In the arrangement described above, control means of varied kinds are formed by the CPU1 and the CPU3 in conjunction with the switches SW1 to SWCN3, S1 to CHG2, etc. which are arranged to provide the CPU1 and the CPU3 with information of varied kinds. These control means include:

(a) Means for detecting mounting of the motor drive device MD on the camera body.

(b) Means for detecting the voltages of the batteries disposed within the camera body and the motor drive device.

(c) Means for selecting the reduction ratio of the film winding transmission system. The selecting means is arranged to automatically set the reduction ratio of the film winding transmission system either at a high reduction ratio or at a low reduction ratio according to the results of detection of the voltage of the power source within the camera body, film moving speed, etc. when the camera is used alone.

(d) Power transmission system matching means for matching the reduction ratio of the film winding transmission system with that of the transmission system disposed within the motor drive device in accordance with the detected voltage of the power source disposed within the motor drive device and the detected moving speed of the film when the camera is used in combination with the motor drive device by mounting the latter thereon.

(e) Tentative rotating means for causing the coupler of the motor drive device to tentatively rotate for adequately coupling it with the coupler of the camera in mounting the motor drive device on the camera.

(f) Detecting means for detecting whether the mechanism within the camera adequately operates when the coupler of the motor drive device is tentatively rotated.

(g) Motor impressed voltage increasing means for driving the film winding motor of the camera at a higher voltage when the camera is used together with the motor drive device than when the camera is used alone.

(h) Actuator operating mode selecting means for selecting a plural actuator operating mode most apposite to the voltage of the battery by selecting a simultaneous supply or a time differentiated supply of currents to actuators including motors M1 to M5 and electromagnets 530 to 532 according to the detected voltage of the battery V1 or V2.

Among the control means of varied kinds described in the foregoing, the control means last described in the paragraph (h) relates to this invention.

Further, in the case of this invention, each of the film winding transmission mechanism K1 disposed within the camera 500 and the power transmission mechanism K3 disposed within the motor drive device 700 includes a high-speed transmission system and a low-speed transmission system. Each of the mechanisms K1 and K3 is arranged to select either the high-speed or low-speed transmission system according to the rotating direction of the motor M1 or M3.

FIG. 1 is a time chart showing the photographing operation sequence of each part obtained (A) in a case where the reduction ratio of the film winding transmission mechanism K1 is set in the mode of low reduction ratio "Lo" for the solo use of the camera and (B) in a case where the film winding transmission mechanism K1 and the power transmission mechanism K3 which is disposed within the motor drive device MD are respectively set in the mode of low reduction ratios "Lo" with the motor drive device MD mounted on the camera.

FIG. 1 shows a manner in which the embodiment operates its actuators when the voltage of the battery V1 or V2 is lower than a given voltage value. In this instance, as shown, the sequence of power supply is controlled in such a way as to prevent the power supply from being effected to more than three actuators at a time.

FIG. 2 is another time chart showing the photographing operation sequence of each part obtained (C) in a case where the reduction ratio of the film winding transmission mechanism K1 is set in the high reduction ratio "Hi" for the solo use of the camera and (D) in a case where the film winding transmission mechanism K1 and the power transmission mechanism K3 which is disposed within the motor drive device MD are respectively set in their high reduction ratio modes "Hi" with the motor drive device MD mounted on the camera.

FIG. 2 shows a manner in which this embodiment operates the actuators when the voltage of the battery V1 or V2 is higher than the given voltage value. In that instance, more than three actuators simultaneously receive power.

In other words, FIGS. 1 and 2 show the results of operation of the actuator operating mode selecting means which selects one of different modes of operating a plurality of actuators as mentioned in paragraph (h) above.

The drawings including FIG. 5 and ensuing ones are flow charts showing the programs to be executed by the CPU1, the CPU2 and the CPU3. The symbols, commands and flags shown in these flow charts are described as follows:

MD: motor drive device. AE: exposure control. AF: automatic focusing. RLS: release sequence in the case of solo use of the camera. MDRLS: release sequence in the case of use of the camera with the motor drive device mounted thereon. BC: battery check (for detecting battery voltage). The battery check levels include:

| First level: | 4 V | Second level: | 3 V |
|---|---|---|---|
| Third level: | 7 V | Fourth level: | 8 V |

Motor control signals are arranged as follows:

```
A = 0; B = 0: stop (open terminal)
A = 1; B = 0: forward rotation
A = 0; B = 1: reverse rotation
A = 1; B = 1: brake (short-circuiting two terminals)
```

Description of the Commands and Flags

Data to be sent from the CPU1 to the CPU3:

```
B7 B6 B5 B4 B3 B2 B1 B0
Command: X MDF M3C2 M3C1 M2C2 M2C1 M1C2 M1C1
   Command name:
     MDF: Indicates the presence or absence of MD
       (0: MD is absent. 1: MD is present.)
     M3C1, M3C2: Motor M3 control command
     M2C1, M2C2: Motor M2 control command
     M1C1, M1C2: Motor M1 control command
   Motor control commands:
     C1, C2: control            0, 0: stop (open)
     0, 1: forward rotation     1, 0: reverse rotation
     1, 1: stop (brake)
```

-continued

Data to be sent from the CPU3 to the CPU1:
B7 B6 B5 B4 B3 B2 B1 B0
Flag: X DCF HLF CHGF FLMF M3F M2F M1F Flag names:

| | 0 | 1 | contents |
|---|---|---|---|
| DCF: | switch S2 on | switch S2 off | one film frame rewinding is detected. |
| HLF: | Lo mode | Hi mode | Feeding mode detected. |
| CHGF: | Charging is completed. | Charging is incompleted. | Mechanical charged state is indicated. |
| FLMF: | Film winding completed. | Film winding incompleted. | Film charging state is indicated. |
| M3F,M2F & M1F: | stop. | In operation. | State of motor is indicated. |

Flag of the CPU1:
Flag name: BCF

| 0 | 1 | contents |
|---|---|---|
| Voltage is high. | Voltage is low. | Indicates state of battery voltage. |

Description of Timers

T1: A timer for checking the charging action of M2.
T3: A timer for checking the charging action of M3.
T4: A timer for determining program duty.
T5: A timer for checking film winding and rewinding.
  Communication between the CPU1 and the CPU2:
Command  00: Standby (halt).       01: Open aperture.
         02: Stop down aperture.   03: Draw out lens.
         04: Draw in lens.         05: Transmit lens data.
         06: Stop lens driving.

In the case of the commands 01 to 04, driving amount data of one byte for the command is sent from the CPU1 to the CPU2. In the case of the command "05", data of 2 bytes is sent from the CPU2 to the CPU1.

Data of the first byte: Full-aperture (max.) F No.
Data of the second byte: Focal length The command "06" is for stopping the movement of the actuator of the lens.

SUMMARIZED DESCRIPTION OF THE OPERATION

When the Camera is Used Alone

The film winding transmission mechanism K1 is set at the low reduction ratio. The film rewinding and shutter charging transmission mechanism K2 transmits the power of the motor M2 to the shutter charging transmission system in the case of exposure operation or to a fork (not shown) in the case of film rewinding.

In photographing, the power supplied to the motors M1, M2, M4 and M5 and electromagnets 530 to 532 is made in sequence as shown in the time chart of FIG. 1.

In rewinding the film, the mechanical connection of the film winding motor M1 to the spool is cut off. Electromagnetic switch RLY1 is opened to cut off the power supplied to the motors M4 and M5 which are disposed within the lens barrel 600. The electronic circuit disposed inside the lens barrel 600 is held in a "halt" state. In the case of this embodiment, the film winding transmission mechanism is set at the low reduction ratio when the camera is used alone. However, the control system may be arranged to set the film winding mechanism K1 at the high reduction ratio in the event of a high battery voltage.

In Using the Camera With the Motor Drive Device

When the motor drive device is mounted on the camera body after the grip 590 is removed from the camera, the camera is electrically connected to the motor drive device via the connection terminal. The mounting of the motor drive device is electrically detected. Further, the battery V2 is connected to the applicable electronic circuit of the camera as a power source. The instant the motor drive device is mounted on the camera, the shutter charging transmission mechanism C is connected to the power transmission mechanism K3 disposed within the motor drive device. Then, the film rewinding transmission mechanism R is connected only to the motor M2.

When the coupler D1 is engaged with the coupler D2, the motor M3 is first reversely rotated to set the power transmission mechanism K3 of the motor drive device at the low reduction ratio. The reverse rotation of the motor M3 then tentatively drives the shutter charging transmission mechanism C. Upon detection of the proper operation of the shutter mechanism, etc. through the result of this tentative driving action, the camera proceeds to prepare for photographing by determining that the couplers D1 and D2 are properly coupled with each other. In the event of improper shutter charging, the power supply to the motor M3 and the actions of other electronic circuits are brought to a stop and the embodiment ceases to operate thereafter.

Since the motors M1 and M3 are receiving the power supply from the battery V2 (12 V) disposed within the motor drive device in this instance, the motor M1 can be driven at a higher speed when the camera is used alone. Further, the shutter charging transmission mechanism C which is to be driven by the motor M3 is also driven at a higher speed than in the case of the solo use of the camera.

The film winding transmission mechanism K1 and the power transmission mechanism K3 which is disposed within the motor drive device are set either at the high reduction ratio or the low reduction ratio according to the voltage of the battery V2. If the voltage of the battery V2 is higher than a given value, they are set at the high reduction ratio. When the film winding transmission mechanism K1 and the power transmission mechanism K3 are set at the high reduction ratio, the power supply to the motors M1 to M5 and to the electromagnets 530 to 532 is effected in a manner as shown in the time chart of FIG. 2. In other words, at least three of these actuators simultaneously receive power in this instance.

However, if the voltage of the battery V2 drops to a value lower than the given value, the reduction ratio of the film winding transmission mechanism K1 and that of the power transmission mechanism K3 are changed to the low reduction ratio (by reversely rotating the motors M1 and M3). Then, the power supplied to the motors M1 to M5 and the electromagnets 530 to 532 is effected in the sequence as shown in the time chart of FIG. 26. In that instance, simultaneous power supply is effected to less than three of these actuators.

In rewinding the film, the connecting position of the electromagnetic switch RLY2 is changed from a contact "a" over to a contact "b". Then, a maximum voltage of 6 V is applied from the DC-DC converter 701 to the motor M2. This causes the motor M2 to drive the film rewinding transmission mechanism R with the same output as in the case of using the camera alone.

Description of the Circuit Operation (Flow Charts)

When the battery V1 is set within the grip 590, a voltage of 6 V is produced at the terminals VBAT1 and VBAT2. This voltage is applied to the terminal VIN of the DC-DC converter 510 (DC/DC1). The converter then produces a voltage of 3 V from its output terminal VDD. This voltage output is applied to the reset circuit 515 and the CPU1. The CPU1 begins to oscillate. When a high level (H) reset signal is produced from the reset circuit 515 after that, the CPU1 begins to operate from a step ST1 as shown in FIG. 5. The CPU2 and the reset circuit 602 act in the same manner as the CPU1 and take a standby mode. Referring to FIG. 5, the CPU1 operates as follows:

At the step ST1: Flags and output ports are set at "0". Step ST2: A check is made for the voltage of the input port P80. If the voltage is found to be above 2 V (with the motor drive device MD mounted), the flow of operation proceeds to a step ST3. Since the battery of 6 V is set, the input voltage is 0 V (MD is not mounted) in this instance and the flow comes to a step ST4. Step ST3A: Data is sent via the BUS5 to the CPU3 for charging at a low gear ratio. This causes the motor M3 to reversely rotate to set the power transmission mechanism within the motor drive device MD at the reduction ratio for a low speed. Then, the shutter charging transmission mechanism C disposed within the camera is tentatively operated through the couplers D1 and D2. Step ST3B: A check is made to determine if the charging action is adequately performed with the couplers correctly coupled with each other. If the charging action has been completed and the flag CHGF is at 0 (CHGF= 0), the flow proceeds to the step ST4. If not (CHGF =1), the flow comes to a stop at a step ST30.

Step ST4: The rewinding switch SWR is checked. If the switch SWR is found to have been operated, the flow comes to a subroutine "REWIND". If not, the flow proceeds to a step ST5. Step ST5: The switch SW1 is checked to determine if it has been operated. If so, the flow proceeds to a step ST6. If not, the flow comes back to the step ST4. Step ST6: The CPU1 renders the converter 510 (DC/DC1) operative by making the level of its output port P03 low. With the converter DC/DC1 thus operated, a voltage of 5 V is produced from its output terminal Ex. The CPU1 checks the voltage of its port P81. If the voltage is found to be at 5 V, the output level of its port P60 is set at a low level to turn on the electromagnetic switch RLY1. With the switch RLY1 turned on, a voltage VBAT is supplied to the lens circuit 600. The flow then comes to a step ST7. Step ST7: The CPU1 communicates with the CPU2 via the BUS4 to receive the intrinsic data of the lens. The flow then comes to a step ST8. Step ST8: The light and distance measuring circuits are rendered operative via the BUS1 and the BUS2. An automatic focusing (AF) computing operation is carried out on data received. The AF data thus obtained is sent to the CPU2 via the BUS4. This causes the AF motor M5 to operate for an automatic focusing action. Further, an automatic exposure control computing operation is performed according to measured light data. The result of the operation is sent via the BUS3 to a display circuit 514 for a display. Step ST9: A check is made to determine if the switch SW1 has been operated. If so, the flow comes to a step ST10. If not, the flow comes to a step ST11. Step ST10: The switch SW2 is checked to determine if it has been operated. If so, the flow comes to a step ST12. If not, the flow comes back to the step ST6. Step ST11: The output level of the port P03 is set at a high level to turn off the DC-DC converter DC/DC1. After that, the flow comes back to the step ST4. Step ST12: A check is made to find if the motor drive device MD is mounted. If so, the flow comes to a subroutine "MDRLS". If not, the flow proceeds to a step ST13. Step ST13: A check is made for the voltage of the battery. If the battery voltage is found to be above 3 V (a second level), the flow proceeds to a step ST14. If the voltage is found to be less than 3 V, the flow comes to a stop at the step ST30.

Step ST14: The output level of the output port P00 is set at a low level of 10 ms to energize the electromagnet Mg1 for a mirror-up action. Further, an aperture control signal is sent out via the BUS4 to operate the motor M4 for aperture control. Step ST15: An instruction for stopping the driving action of the AF motor M5 is sent out via the BUS4 to bring the AF action to a stop. Step ST16: Pulse signals which are formed in accordance with a shutter time are sent to the output ports P01 and P02 for exposure control.

Step ST17: The level of the output from the output port P00 is set at the low level of 10 ms to energize the electromagnet Mg1 for moving the mirror down. Step ST18A: The battery voltage is checked. If the battery voltage is above 4 V (a first level), the flow comes to a step ST19. If not, the flow proceeds to a step ST18B. Step ST18B: The flag is set at "1" and the flow proceeds to the step ST19. Step ST19: An instruction for opening the aperture is sent to the CPU2 through the BUS4. Step ST20: An instruction for the forward rotation of the motor M2 is sent via the BUS5 to the CPU3 for mechanical charging. Step ST21: The flow waits for arrival of information on completion of the aperture opening action from the CPU2. Step ST22A: A distance measuring action begins. Step ST22B: A subroutine "M1CHG" for driving the motor M1 is executed by sending data via the BUS5 to the CPU3. The motor M1 either rotates forward or rotates backward according to the value of the flag BCF. (The reduction ratio of the film winding transmission system is selected according to the level of the battery voltage.) Step ST23: The flow waits for arrival of information on completion of the action of the motor M2 (M2F=0) from the CPU3.

Step ST24: A check is made to see if the mechanical charging action has been completed. If so (CHGF=0), the flow proceeds to a step ST25. If not (CHGF=1), the flow comes to a stop. Step ST25: An instruction for a lens driving action is sent to the CPU2 via the BUS4. Step ST26: The flow waits for arrival of information on completion of the action of the motor M1 (M1F=0) from the CPU3. Step ST27: A check is made to determine if a film charging action has been completed. If so (FLMF=0), the flow comes back to the step ST7. If not (FLMF=1), the flow proceeds to a subroutine "REWIND".

Sequential operation for shutter release to be performed with the motor drive device MD mounted (MDRLS):

Step ST40: The battery voltage is checked. If the voltage is above 5 V (a fourth level), the flow proceeds to a step ST41. If not, the flow comes to a stop. (Detection of battery voltage) Step ST41: The mirror is moved up by making the output level of the output port P00 low (L) to energize the electromagnet Mg1. An aperture control signal is sent via the BUS4 for operating the motor M4 to control the aperture. Step ST42: The flow waits for arrival of information on completion of the action of the motor M1 (M1F=0) from the CPU3. Step ST43: A check is made for completion of film charging. If it has been completed (FLMF=0), the flow proceeds to a step ST44. If not (FLMF=1), the flow comes to the subroutine "REWIND". Step ST44: An instruction for stopping the driving action of the AF motor M5 is sent out via the BUS4 to bring the AF action to a stop. Step ST45: An exposure control action is performed by sending pulse signals from the output ports P01 and P02 according to the shutter time. Step ST46: The level of the output from the output port P00 is set at the low level of 10 ms to energize the electromagnet Mg1 for moving the mirror down. Step ST47: The battery voltage is checked to determine if it is above 7 V (a third level). If so, the flow proceeds to a step ST48. If not, the flow comes to a step ST60. Step ST48: An instruction for opening the aperture is sent to the CPU2 via the BUS4. Step ST49: A signal is sent to the CPU3 via the BUS5 to have a subroutine "M3CHG" executed by driving the motor M3. Step ST50: A signal is sent to the CPU3 via the BUS3 to have a subroutine "M1CHG" executed by driving the motor M1.

Step ST51: The flow waits for arrival of information on completion of the aperture opening action from the CPU2. Step ST52A: A check is made to determine if the switch SW1 has been operated. If so, the flow proceeds to a step ST52B. If not, the flow comes to a step ST54. Step ST52B: If the flag BCF is at "0", the flow comes to a step ST53. If it is at "1", the flow proceeds to a step ST52C. Step ST52C: Light and distance measuring actions only are performed. Meanwhile the focusing motor M5 is inhibited from driving. Step ST52D: If the flag M3F is at "0", the flow proceeds to a step ST52E. If the flag M3F is at "1", the flow comes back to the step ST52C to repeat the light and distance measuring actions only. Step ST52E: The focusing motor M5 is allowed to drive. The flow then comes to the step ST54. Step ST53: The light measuring action, the distance measuring action and the AF action are performed. Step ST54: A check is made to determine if the operation of the motor M3 has been completed (M3F=0). If M3F=1, the flow comes back to the step ST52A. Step ST55: A check is made to determine if the mechanical charging action has been completed. If so (CHGF=0), the flow proceeds to a step ST56. If not (CHGF=1), the flow comes to a stop. Step ST56: The switch SW2 is checked to determine if it has been operated. If so, the flow comes to the step ST40. If not, the flow proceeds to a step ST57. Step ST57: The flow waits for arrival of information on completion of the action of the motor M1 (M1F=0) from the CPU3. Step ST58: A check is made to determine if the film charging has been completed. If so (FLMF=0), the flow comes back to the standby step ST4. If not (FLMF=1), the flow comes to the subroutine "REWIND".

MDL mode (the power transmission mechanism K3 is set at the low reduction ratio with the motor drive device mounted on the camera):

Step ST60: An instruction for opening the aperture is sent to the CPU2 via the BUS4. Step ST61: The L flag BCF is set at "1". (Result of battery voltage detection) Step ST62: An instruction for driving the motor M3 is sent via the BUS5 to the CPU3. The mechanical charging action is performed. Since the flag BCF is at "1", the charging action is performed at the low gear ratio. (Selection of the rotating direction of the motor M3 and selection of the gear ratio)

Step ST63: The flow waits for arrival of information on completion of the aperture opening action from the CPU2. Step ST64: The distance measuring action begins. Step ST65: An instruction for driving the motor M1 is sent via the BUS5 to the CPU3 to perform film charging. Since the flag BCF is at "1", the film charging action is performed at the low gear ratio. (Selection of the rotating direction of the motor M1 and that of the gear ratio) Step ST66: The flow waits for arrival of information on completion of the action of the motor M3 (M3F=0). When the information M3F=0 is obtained, the flow comes to the step ST24.

Sequential Operation for Film Rewinding

Step ST70: The DC-DC converter DC/DC1 is turned on. The flag is cleared. Step ST71: The output level of the output port P60 is set at a high level ("H") to turn off the electromagnetic switch RLY1. The command HALT is sent to the CPU2 to bring the CPU2 into a low electric energy consuming state. Step ST72: A check is made for the presence or absence of the motor drive device MD. If the motor drive device MD is found to be mounted, the flow comes to a step ST74. If not, the flow proceeds to a step ST73. Step ST73: The output level of the output port P04 is set at a low level to turn on the electromagnetic switch RLY2. As a result, the voltage of the terminal VM1 becomes 6 V. Step ST74: A command for the start of a film rewinding action is sent to the CPU3. Step ST75: A state of film rewinding is displayed. (The film counter down counts by counting a number of times for which flag S3F=0 is obtained from the CPU 3.) Step ST76: A check is made to determine if the action of the motor M2 has come to an end (M2F=0). In the case of M2F=1, the flow comes back to the step ST75. Step ST77: The counted value of the film counter is checked. If it is found to be zero, the flow proceeds to a step ST78. If not, the flow comes to the step ST79. Step ST78: Completion of film rewinding is displayed. Step ST79: Incompletion of film rewinding is displayed.

M1CHG:

This program is provided for determining the driving direction of the motor M1 between forward rotation and reverse rotation. Step ST90: The flag BCF is checked for its value. If the flag BCF is at "0", the flow proceeds to a step ST91. If it is at "1", the flow comes to a step ST96. Step ST91: The flag HLF is checked for its value. If the flag HLF is found to be at "1", the flow proceeds to a step ST92. If it is "0", the flow comes to the step ST96. Step ST92: A check is made for the presence of the motor drive device MD. If the motor drive device MD is mounted, the flow proceeds to a step ST93. If not, the flow comes to a step ST94. Step ST93: The output level of the output port P04 of the CPU1 is set at a high level to turn off the electromagnetic switch RLY2. Then, the driving voltage for the motor M1 is increased to 12 V. (The voltage applied to the motor M1 is increased with the device MD mounted on the camera.) Step ST94: An instruction for the forward rotation of the motor M1 (for the high gear ratio) is sent to the CPU3. Step ST95: The flow comes back to the former program. Step ST96: A check is made for the presence of the motor drive device MD. If the device MD is mounted, the flow proceeds to a step ST97. If not, the flow comes to a step ST98. Step ST97: The output level of the output port P04 of the CPU1 is set at a high level. The electromagnetic switch RLY2 is thus turned on to set the driving voltage of the motor M1 at 6 V. Step ST98: An instruction is sent to the CPU3 for the reverse rotation of the motor M1 (for the low gear ratio). The flow then comes to the step ST95.

M3CHG

This program is provided for determining whether the motor M3 is to be forwardly or reversely rotated. Step ST100: The flag BCF is checked for its value. If it is at "0", the flow proceeds to a step ST101. If not, the flow comes to a step ST104. Step ST101: The flag HLF is checked for its value. If it is "1", the flow proceeds to a step ST102. If it is "0", the flow comes to the step ST104. Step ST102: An instruction is sent to the CPU3 for the forward rotation of the motor M3 (for selection of the higher speed gear train). Step ST103: The flow comes back to the former program. Step ST104: An instruction is sent to the CPU3 for the reverse rotation of the motor M3 (for selecting the lower speed gear train). The flow then comes to the step ST103.

Sequential Operation of the CPU3

When the DC-DC converter DC/DC1 is turned on by the CPU1, a voltage of 5 V is applied to the reset circuit 517 and the CPU3. Then the level of a reset signal produced from the reset circuit 517 becomes high to cause the CPU3 to operate starting with a step ST200. Step ST200: The motor control output levels of the ports PA0 to PA5 are set at low levels. (Motors are stopped.) Step ST201: Flags are cleared. Step ST202: Interruptions are allowed. Step ST203: The flow comes to a halt.

Interruptions From the CPU1

Step ST210: Upon receipt of a command from the CPU1, the flag of the CPU3 is sent. Step ST211: A subroutine for controlling the motor M1 is called. Step ST212: A subroutine for controlling the motor M2 is called. Step ST213: A subroutine for controlling the motor M3 is called.

Motor M1 Control Subroutine

Step ST220: The flag FLMF is checked. If it is found to be at "1", the flow comes to a step ST233. If it is "0", the flow comes to a step ST221. Step ST221: The motor M1 control instruction from the CPU1 is checked (a discrimination between the command bits "0" and "1"). If it is found to be a halt command, the flow comes to a step ST233. If it is a driving command, the flow proceeds to a step ST222. Step ST222: The flag M1F indicating the operation of the motor M1 is checked. If it is found to be at "1" (indicating that the motor M1 is in action), the flow comes to a step ST231. If the flag is at "0" (indicating that the motor M1 is in repose), the flow proceeds to a step ST223. Step ST223: A check is made for the driving mode of the motor M1. The flow proceeds to a step ST224 if it is in a mode "Hi" (forward rotation) or comes to a step ST240 in the event of a mode "Lo" (reverse rotation). Step ST224: A check is made for the presence of the motor drive device MD. If the device MD is mounted, the flow proceeds to a step ST225. If not, the flow comes to a step ST226. Step 225: A register TR is set at 50 ms. The flow then comes to a step ST227. Step ST226: The register TR is set at 100 ms. The flow then proceeds to the step ST227. Step ST227: A timer T4 is allowed to start from "0". The flag HLF is set at "0": Step ST228: The output level of the port PA0 is set at a high level (H) and that of the port PA1 at a low level (L) to cause the motor M1 to rotate forward. The flag M1F is set at "1". Step ST229: The switch S2 is allowed to interrupt. Step ST230: The timer T5 is set at the value of the register TR and down counting begins. Step 231. An interruption is allowed. Step ST232: The flow comes back to the main program. Step ST233: The output levels of the prots PA0 and PA1 are set at "H" to bring the rotation of the motor M1 to a stop in a state of having brake application. The flag M1F is set at "0" and the flow comes to the step ST231. Step ST240: A check is made for the presence of the motor drive device MD. If the device MD is mounted, the flow proceeds to a step ST241. If not, the flow comes to a step ST242. Step ST241: The register TR is set at 150 ms. The flow comes to a step ST243. Step ST242: The register TR is set at 300 ms. The flow proceeds to a step ST243. Step ST243: The output levels of the port PA0 is set at "L" and the port PA1 at "H" to have the motor M1 reversely rotate. The flag M1F is set at "1". Step ST244: The interruption of the switch S2 is disabled. The flow then comes to a step ST229.

INTERRUPTION BY SWITCHES S1, S2 AND S3 AND A TIMER T5

Interruption by the Switch S1

Step 250: The timer T5 is set at a value of the register TR and down-counting begins. Step ST251: The interruption is allowed. Step ST252: The flow comes back to the program preceding the interruption.

Interruption by the Switch S2

Step ST253: The flow comes to a step ST256 if the camera is in process of film rewinding or to a step ST254 if the camera is in process of film winding. Step ST254: The operation of the timer T4 is brought to a stop and a duty ratio corresponding to the value of the timer T4 is selected. Step ST255: The speed of the motor M1 is lowered by turning the motor M1 on and off according to the duty ratio selected. The flow then comes to the step ST251. Step ST256: The flag DCF is set at "0" and the flow comes to the step ST251.

Interruption by the Switch S3

Step ST257: The flow comes to a step ST259 if the camera is in process of film rewinding or to a step ST258 if the camera is in process of film winding. Step ST258: The operation of the timer T5 is brought to a stop. The motor M1 is turned off. The flag M1F is set at "0". The flow then comes to the step ST251. Step ST259: The flag DCF is set at "0". The flow comes to the step ST251.

Interruption by the Timer T5

Step 260: The flow comes to a step ST265 if the camera is in process of film rewinding or to a step ST261 if the camera is in process of film winding. Step ST261: The motor M1 is turned off. Step ST262: A check is made for the driving state of the motor M1. If it is found to be in the mode "Hi", the flow comes to a step ST264. If it is in the mode "Lo", the flow comes to a step ST263. Step ST263: The flag M1F is set at "0" and, then the flow comes to the step ST251. Step ST264: The flag HLF is set at "1" and, the flow comes to the step ST240. Step ST265: The motor M2 is turned off. The flag M2F is set at "0". The flow comes to a step ST266. Step ST266: The flow comes back to the program preceding the interruption.

SUBROUTINE FOR CONTROLLING THE MOTOR M2

Step ST270: The instruction of the CPU1 for controlling the motor M2 (command bits "2" and "3") is checked. The flow comes to a step ST282 if it is an instruction for stopping or to a step ST271 if it is a driving instruction. Step ST271: The flag M2F which shows the operation of the motor M2 is checked. If the flag M2F is at "1" (indicating that the motor M2 is in action), the flow comes to a step ST275. If the flag M2F is at "0" (indicating that the motor M2 is in repose), the flow proceeds to a step ST272. Step ST272: The motor M2 is checked for its driving mode. The flow comes to a step ST273 if the motor M2 is in the charging mode (forward rotation) or to a step ST320 if the motor is in the film rewinding mode (reverse rotation). Step ST273: The output level of the port PA2 is set at "H" and that of the port PA3 at "L" to cause the motor M2 to forwardly rotate for mechanical charging. After that, the flag M2F is set at "1". Step ST274: The register TR2 is set at 200 ms. The timer T1 is set at the value of the register TR2 and is allowed to begin to operate. The flow then proceeds to a step ST275. Step ST275: An interruption is allowed. Step ST276: The flow comes back to the main program.

Interruption by the Switch CHG1

Step ST280: The timer T1 is stopped from operating. The flag CHGF is set at "0". Step ST281: The flag M2F is checked. The flow comes to a step ST282 if the flag M2F is at "1" or to a step ST308 if the flag is at "0". Step ST282: The motor M2 is turned off. The flag M2F is set at "0". The flow then comes to a step ST289.

Interruption by the Timer T1

Step ST283: The flag CHGF is set at "1". Step ST284: The flag M2F is checked. The flow comes to the step ST282 if the flag M2F is at "1" or to a step ST285 if the flag M2F is at "0". Step ST285: The driving mode of the motor M3 is checked. The flow proceeds to a step ST286 if the motor M3 is in the mode "Hi" (forward rotation) or to a step ST308 if the motor is in the mode "Lo" (reverse rotation). Step ST286: The motor M3 is turned off. The flow waits for 10 ms. Step ST287: The motor M3 is set into the mode "Lo". The register TR2 is set at 300 ms. The flag HLF is set at "1". The flow comes to a step ST288.

Interruption by the Switch CHG2

Step ST288: The timer T1 is set at the value of the register TR2. The flow proceeds to a step ST289. Step ST289: An interruption is allowed. Step ST290: The flow comes back to the program preceding the interruption.

Subroutine for Controlling the Motor M3

Step ST300: An instruction of the CPU1 for controlling the motor M3 (command bits "4" and "5") is checked. The flow comes to a step ST308 if the instruction is for stopping the motor M3 or to a step ST301 if the instruction is for driving. Step ST301: The flag M3F for the operation of the motor M3 is checked. If the flag M3F is found to be at "1" (indicating that the motor is in action), the flow comes to a step ST304. If the flag is at "0" (indicating that the motor is in action), the flow comes to a step ST304. If the flag is at "0" (indicating that the motor is in repose), the flow proceeds to a step ST302. Step ST302: The driving mode of the motor M3 is checked. The flow comes to a step ST303 if the motor M3 is found to be in the mode "Hi" (forward rotation) or to a step ST307 if the motor is in the mode "Lo" (reverse rotation). Step ST303: The output level of the port PA4 is set at "H" and that of the port PA5 at "L" to cause the motor M3 to forwardly rotate. The flag M3F is set at "1". The register TR2 is set at 100 ms. The flow proceeds to a step ST304. Step ST304: The timer T1 is set at the value of the register TR2 and is allowed to begin to down count. Step ST305: An interruption is allowed. Step ST306: The flow comes back to the main program. Step ST307: The output level of the port PA4 is set at "L" and that of the port PA5 at "H" to cause the motor M3 to reversely rotate. The flag M3F is set at "1". The register TR2 is set at 300 ms. The flow comes to the step ST304. Step ST308: The motor M3 is turned off. The flag M3F is set at "0". The flow then comes to the step ST305.

Film Rewinding by the Motor M2

Step ST320: The output level of the port PA0 is set at "H" and that of the port PA3 at "L" to cause the motor M1 to forwardly rotate for 50 ms. Step ST321: The output level of the port PA0 is set at "L" and that of the port PA3 also at "L" to turn off the motor M1. Step ST322: The output level of the port PA2 is set at "L" and that of the port PA3 at "H" to cause the motor M2 to reversely rotate. Step ST323: The flow waits till three pulses are received from the switch S2. Step ST324: The output level of the port PA2 is set at "H" and that of the port PA3 also at "H" to promptly bring the motor M2 to a stop by brake application. The flow waits 30 ms. Step ST325: The output level of the port PA2 is set at "L" and that of the port PA3 at "H" to cause the motor M2 to reversely rotate for film rewinding. The flag M2F is set at "1". Step ST326: The register TR1 is set at 200 ms. The timer T5 is set at the value of the register TR1 and is allowed to begin to operate. The flow then comes to the step ST305.

In the embodiment described, the actuators for the various mechanisms are allowed to operate in parallel in such a way as to have the actions of the mechanisms within the camera simultaneously performed when the power supply voltage is above a given level. In the event of a power supply voltage below the given level, the operation of the actuators is controlled in such a way as to inhibit simultaneous execution of the actions of more than three of the mechanisms disposed within the camera. This arrangement lowers the lowest serviceable voltage of the battery for a longer battery replacement cycle.

Further, in the case of the embodiment described, the voltage of the power source V2 of the accessory (i.e. the power drive device) is supplied via the voltage limiting means 705 (a voltage dividing resistor) to the port P80 of the CPU1 when the accessory is mounted on the camera. This enables the input voltage level detecting means disposed within the CPU1 to electrically detect the mounting of the accessory on the camera. At the same time, the electrical connection of the the electronic circuit disposed within the camera to the electronic circuit disposed within the accessory is detected. In addition to that, the kind of the accessory mounted is also detected. The CPU1 and other electronic circuits then make preparations for next actions as necessary. In accordance with this invention, therefore, an accessory mounting detector can be arranged to be capable of detecting both the mechanical connection and the electrical connection of the accessory to the camera without the need for a limit switch or the like. In the case of the embodiment illustrated, the power drive device is shown by way of example as the accessory. However, the accessory is of course may be some other accessory such as an interchangeable lens.

Further, it is also apparent that the accessory does not have to have a power source disposed therein.

What is claimed is:

1. A camera comprising:
   (a) a film feeding mechanism for feeding a film to take an exposure on a next frame;
   (b) a charging mechanism;
   (c) a focusing mechanism;
   (d) a first actuator serving as a drive source for driving said film feeding mechanism;
   (e) a second actuator serving as a drive source for driving said charging mechanism;
   (f) a third actuator serving as a drive source for driving said focusing mechanism;
   (g) voltage detecting means for detecting a voltage of a power source; and
   (h) control means for controlling said first, second and third actuators, said control means permitting, when the voltage of said power source detected by said voltage detecting means has a value not less than a predetermined value, said third actuator to operate when said first actuator is in process of operating, and said control means prohibiting, when the voltage of said power source detected by said voltage detecting means has a value less than the predetermined value, said third actuator from operating when said first actuator and said second actuator are in process of operating.

2. A camera according to claim 1, wherein at least one of said first, second and third actuators is a motor.

3. A camera according to claim 1, wherein said film feeding mechanism is arranged to wind a film.

4. A camera according to claim 1, wherein said charging mechanism is arranged to charge a shutter.

5. A camera comprising:
   (a) a first driving mechanism for performing a camera operation;
   (b) a second driving mechanism for performing a camera operation;
   (c) a third driving mechanism for performing a camera operation;
   (d) a first actuator serving as a drive source for driving said first driving mechanism;
   (e) a second actuator serving as a drive source for driving said second driving mechanism;
   (f) a third actuator serving as a drive source for driving said third driving mechanism;
   (g) voltage detecting means for detecting a voltage of a power source; and
   (h) control means for controlling said first, second and third actuators, said control means permitting, when the voltage of said power source detected by said voltage detecting means has a value not less than a predetermined value, said first, second and third actuators to simultaneously operate, and said control means prohibiting, when the voltage of said power source detected by said voltage detecting means has a value less than the predetermined value, at least one of said first, second and third actuators from operating simultaneously with the others of said first, second and third actuators.

6. A camera according to claim 5, wherein said first driving mechanism includes a charging mechanism, and wherein said second driving mechanism includes a diaphragm driving mechanism.

7. A camera according to claim 5, wherein at least one of said first, second and third actuators is a motor.

8. A camera body adapted to detachably mount thereon an accessory having a power source, comprising:
 (a) a camera-side contact arranged to come into contact with an accessory-side contact arranged in said accessory and electrically connected to said power source;
 (b) a judgment circuit for judging a level of a voltage electrically connected to said camera-side contact; and
 (c) inputted-voltage limiting means for limiting, when said accessory is mounted on said camera body, the voltage inputted to said judgment circuit to a value lower than a bias voltage of a circuit disposed in said camera body.

9. A camera body according to claim 8, wherein said inputted-voltage limiting means includes a voltage dividing resistor which is electrically connected between said power source and said accessory-side contact.

* * * * *

UNITED STATES PATENT AND TRADEMARK OFFICE
CERTIFICATE OF CORRECTION

PATENT NO. : 4,992,821

DATED : February 12, 1991

INVENTOR(S) : Masayoshi Kiuchi, et al.

It is certified that error appears in the above-identified patent and that said Letters Patent is hereby corrected as shown below:

COLUMN 1:

Line 22, "etc.. Some" should read --etc., some--.

Line 23, "is" should read --are--.

Line 61, "is" or --is not--.

COLUMN 3:

Line 9, "to" should be deleted.

Line 18, "an" should read --a--.

COLUMN 12:

Line 61, "L" should be deleted.

Line 68, "ratio)" should read --ratio).--.

COLUMN 13:

Line 68, "ratio)" should read --ratio).--.

UNITED STATES PATENT AND TRADEMARK OFFICE
CERTIFICATE OF CORRECTION

PATENT NO. : 4,992,821

DATED : February 12, 1991

INVENTOR(S) : Masayoshi Kiuchi, et al.

It is certified that error appears in the above-identified patent and that said Letters Patent is hereby corrected as shown below:

COLUMN 15:

Line 26, "a" should read --the--.

Signed and Sealed this

Third Day of November, 1992

Attest:

DOUGLAS B. COMER

Attesting Officer

Acting Commissioner of Patents and Trademarks